United States Patent [19]
Bayley et al.

[11] Patent Number: 4,978,860
[45] Date of Patent: Dec. 18, 1990

[54] OPTICAL SYSTEM FOR A LARGE DEPTH-OF-FIELD BAR CODE SCANNER

[75] Inventors: Brian J. Bayley, Palo Alto; Michael J. Brosnan, Fremont, both of Calif.; Neil Hochgraf, Rochester, N.Y.

[73] Assignee: Hewlett-Packard Company, Palo Alto, Calif.

[21] Appl. No.: 247,216

[22] Filed: Sep. 21, 1988

[51] Int. Cl.$^5$ .............................................. G06K 7/10
[52] U.S. Cl. ................................ 250/568; 250/208.1; 235/462
[58] Field of Search ............... 250/566, 568, 569, 570, 250/216, 208.1; 235/462–467, 472

[56] References Cited

U.S. PATENT DOCUMENTS

| | | | |
|---|---|---|---|
| 3,876,841 | 4/1975 | Kramer et al. | 369/120 |
| 4,408,120 | 10/1983 | Hara et al. | 235/472 |
| 4,501,493 | 2/1985 | Kubota | 250/201 |
| 4,560,862 | 12/1985 | Eastman et al. | 235/472 |
| 4,612,437 | 9/1986 | Ohsato | 250/201 |
| 4,678,288 | 7/1987 | Lonsdale et al. | 250/566 |
| 4,682,016 | 7/1987 | Inoue | 250/566 |
| 4,818,886 | 4/1989 | Drucker | 250/566 |
| 4,831,275 | 5/1989 | Drucker | 250/566 |

FOREIGN PATENT DOCUMENTS 59-154573 9/1984 Japan.

Primary Examiner—David C. Nelms

[57] ABSTRACT

An optical system for a bar code scanner has a working range that is not determined by the lens aperture, but by the dimension and orientation of the detector. In the preferred embodiment, the desired working range is imaged onto a detector array using a modified Scheimpflug arrangement. The array in the first Scheimpflug plane with respect to the lens defines a second Scheimpflug plane that intersects the bar code tag to be read. So long as the bar code tag intersects the image of the detector array in the second Scheimpflug plane, a portion of the image of the bar code tag will be in focus on at least one of the elements of the detector array. The lens aperture can be as large as desired to maximize resolution and minimize illumination needs without adversely affecting the working range. The scanner's bar code illumination can be directed along the second Scheimpflug plane, which is off the optical axis of the lens. With separate illumination and detection paths, the optical system of the invention does not require beam splitters or mirror/aperture arrangements needed by the conventional systems.

21 Claims, 7 Drawing Sheets

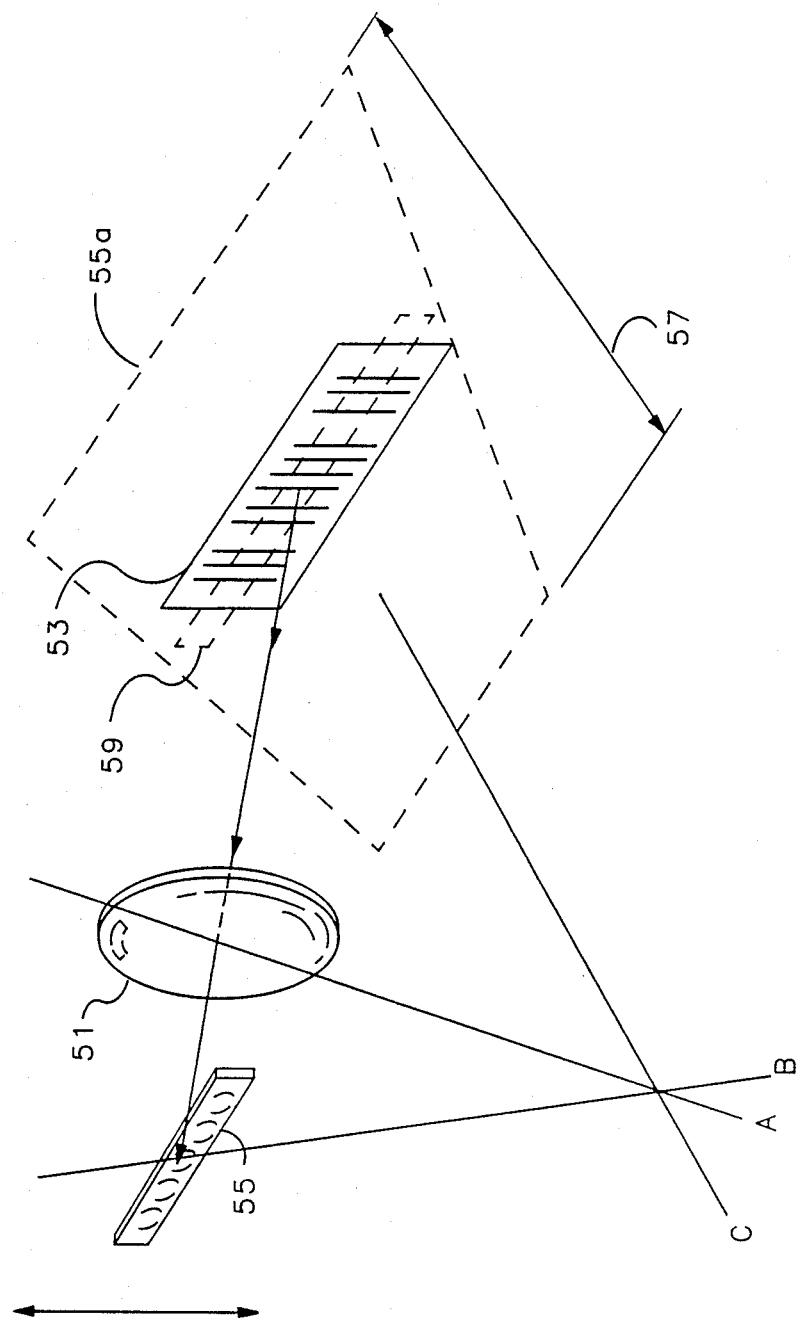

OPTICAL SYSTEM FOR A LARGE DEPTH-OF-FIELD BAR CODE SCANNER

BACKGROUND AND SUMMARY OF THE INVENTION

The optical system of a bar code scanner comprises apparatus for illuminating the bar code tag and apparatus for detecting the reflected light from the bar code tag. To read a bar code, the operator points the scanner at the bar code tag at a distance from the tag within the scanner's working range. In most optical systems, the working range over which the scanner will operate is determined by the apertures of the lenses and the widths of the bars in the bar code being read. Performance is also limited by mounting tolerances for the lenses and the effects of aberration in the lenses.

One type of scanner uses an optical system that forms an image of the bar code tag on the detector, which produces an electrical signal corresponding to the dark and light pattern of the bars and spaces in the bar code. This type of optical system is referred to as "detector resolved". The operation of this type of scanner is limited by the ability of its detector to resolve the optical image of the bar code into an electronic signal.

The detector may be a single element photodetector, or a multiple element photodetector array that spans the image of the bar code. In a single element system, an optical scanning mechanism, such as a rotating mirror, sweeps the image of the bar code across the detector element to produce the signal. This sweep produces a serial image of a "scan line", a line through the bar code approximately perpendicular to the bars and spaces. In a multiple element system, the detector array is electronically scanned.

FIG. 1 shows a diagram of the conventional optical arrangement for a bar code scanner with a multiple element detector. The lens 11 forms an image of the bar code tag 13 to be read on an array of photodetectors 15. Normally, the object plane 14 (the plane of the tag), the plane of the lens 12, and the image plane 16 (the plane of the detector array) are mutually parallel, and are perpendicular to the optical axis 18 of the lens. The elements 17 of the detector 15 are positioned along a line parallel with the scan line for the bar code tag 13, intersecting the optical axis 18 of the lens.

The working range of this optical system is the range of distance from the lens 11 over which the image of the bar code tag 13 remains sufficiently focused for the detector array 15 to recognize bars from spaces and to measure the widths of the bars and spaces accurately. The working range is a function of the aperture of the lens system (the f/#), lens aberrations, and the resolution of the bar code being read.

An alternative type of optical system for bar code scanners uses a laser as its source of illumination. The laser produces a spot that is scanned across the bar code, while a detector collects the reflected light from a field that covers the bar code area or from a field that follows the scanned spot. This type of optical system is referred to as "emitter resolved". The fundamental limitation of this type of system is the tradeoff between the "waist" of the illuminating laser beam and the distance over which the laser beam can be maintained within the required diameter. Diffraction effects due to the aperture for the laser beam limit this distance. For scanning high resolution bar codes with element widths about 0.0075 inch (0.19 mm.), a beam with about 0.010 to 0.015 inch (0.25 to 0.38 mm.) diameter is commonly used. At this beam diameter, diffraction limits the working range to about 7 inches (18 cm.).

Still other optical systems for bar code scanners use light emitting diodes (LEDs) for illumination. These systems, however, typically have even more limited working ranges. In a detector resolved arrangement, the level of illumination available gives rise to the conflicting constraints on aperture size discussed above. In an emitter resolved arrangement, the practical limit of the working range is about half that of a laser system due to the finite size of the LED source. Typical LED bar code scanners have a working range of about 2 inches.

An ideal bar code scanner would have a large working range, while being capable of reading bar codes with very narrow bars and spaces, using a minimum amount of illumination power. However, the optical requirements for these goals conflict. Maximizing the working range requires a small lens aperture (a large f/#), while maximizing resolution requires a large lens aperture because of diffraction effects. A high f/# lens in the collection path also limits the available signal, conflicting with the goal of minimizing illumination power.

An object of the invention is to provide an optical system for a bar code scanner that allows a large working range, high resolution and low illumination requirements.

The invention is an optical system for a bar code scanner in which the working range is not determined by the lens aperture, but primarily by the dimension and orientation of the detectors. In a preferred embodiment, the desired working range is imaged onto a detector array using a modified Scheimpflug arrangement. The detector array in the first Scheimpflug plane with respect to the lens defines a second Scheimpflug plane that intersects the bar code tag to be read.

So long as the bar code tag intersects the image of the detector array in the second Scheimpflug plane, a portion of the image of the bar code tag will be in focus on at least one of the elements of the detector array. The lens aperture can be as large as desired to maximize resolution and minimize illumination needs, and thus power consumption, without adversely affecting the working range.

The optical system of the invention also allows the scanner's bar code illumination to be directed along the second Scheimpflug plane, which is off the optical axis of the lens. This eliminates a fundamental illumination problem of the conventional optical arrangement, that the illumination and detection paths through the optical elements must coincide for good depth of field. With separate illumination and detection paths, the optical system of the invention does not require beam splitters or mirror/aperture arrangements needed by the conventional systems.

In one alternative embodiment, the long axis of the detector array is positioned perpendicular to the long axis of the image of the bar code tag, and a scanning mechanism scans the bar code image across the detector array to produce a scan line. In a second embodiment, the long axis of the detector array is positioned parallel to the long axis of the image of the bar code tag, and a scanning mechanism scans the detector array across the image of the working range to read the bar code tag. It is also possible to move the detector array itself to scan the image of the working range in either of these embodiments. Another alternative is to omit the scanning mechanism, and require the operator to manually scan across the bar code tag.

Another object of the invention is to provide an optical system for a bar code scanner with no moving parts, low power consumption, and with the illumination source not in the same optical line as the detector.

In another alternative embodiment, a two dimensional detector array is used, eliminating the need for the scanning mechanism. The two dimensional array is imaged over the working range in one dimension and across the width of the bar code tag in the other dimension. This system, with no moving parts, provides for a very rugged bar code scanner.

DESCRIPTION OF THE DRAWINGS

FIG. 5 shows a schematic diagram of a second embodiment of an optical system with a scanned linear detector array, constructed in accordance with the teachings of the invention.

DETAILED DESCRIPTION OF THE INVENTION

Figure 2:
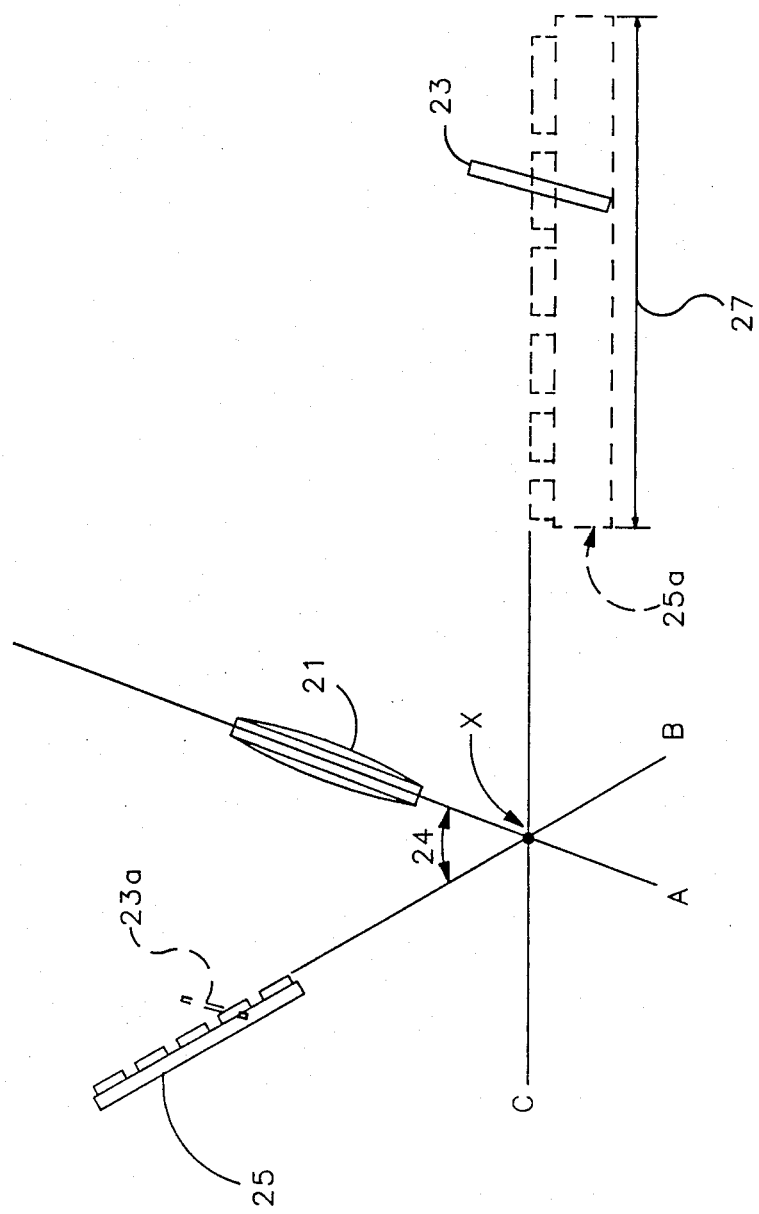
FIG. 2 shows a diagram illustrating the principal of the optical system of the invention.

A simplified diagram illustrating the optical principal of the optical system of the invention is shown in FIG. 2. The lens 21 forms an image 25a of a photodetector array 25 that defines the working range of the bar code reader in a plane that intersects the bar code tag 23 to be read. The principal plane of the lens A, the plane of the detector array B, and the working range plane C have a common intersection line X, and thus are arranged in what is known as the Scheimpflug condition.

Figure 1:
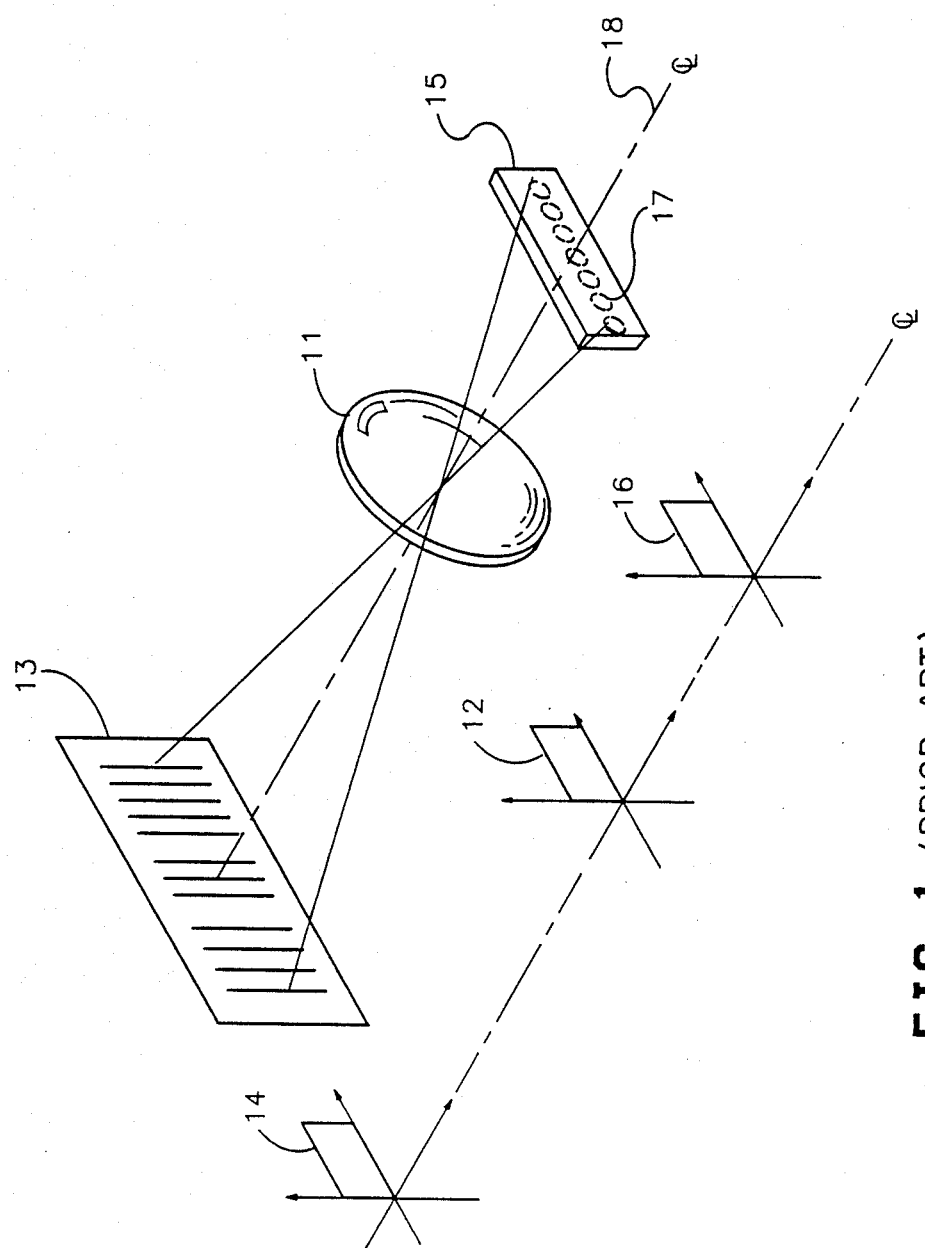
FIG. 1 shows a diagram of the conventional optical arrangement for a bar code scanner with a multiple element detector.

With this arrangement, the lens 21 forms an image 23a of the bar code tag 23 on the detector array 25, such that when the bar code tag 23 is within the working range 27, a horizontal slice of the image 23a of the bar code will be substantially in focus on at least one of the elements of the detector array. In contrast to the conventional optical arrangement illustrated in FIG. 1, the plane of the image 23a of the bar code tag does not coincide with the plane of the detector 25.

Figure 3:
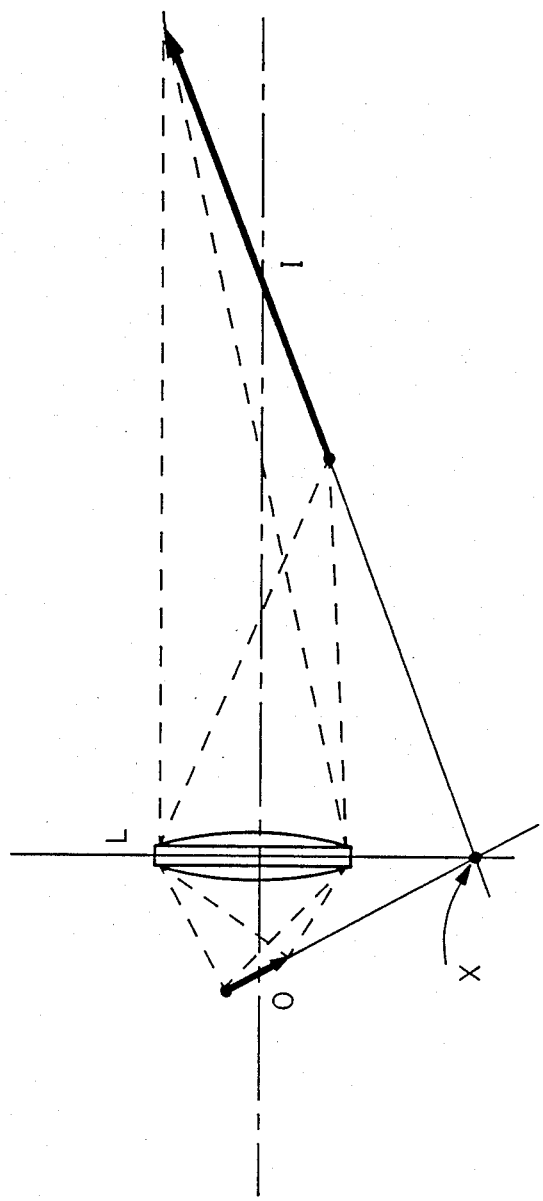
FIG. 3 is a diagram illustrating the optical properties of an optical system operating in the Scheimpflug condition.

The optical properties of an optical system operating in the Scheimpflug condition are illustrated in FIG. 3. In this arrangement, the object O is tilted with respect to the optical axis of the lens L. The lens L forms an image I of the object, but that image is in focus only on an image plane that is also tilted with respect to the optical axis of the lens. The geometry of the Scheimpflug condition is such that the object plane, the lens plane and the image plane intersect at a common line X.

Typically, a Scheimpflug arrangement would be used in a camera to focus a scene located in a large, tilted object plane (the face of a tall building from near its base) onto an image plane. The object plane and the image plane must be carefully aligned with respect to the lens plane to properly focus the entire image onto the image plane.

Referring again to FIG. 2, it can be seen that the optical system of the invention varies significantly from the classic Scheimpflug arrangement. One important difference is that the image 23a of the bar code tag is mostly out of focus on the plane of detector 25. The alignment of the plane of the bar code tag to the Scheimpflug plane C is not critical, and the detector can read the bar code at a wide range of angles as long as the bar code tag 23 intersects the Scheimpflug plane C within the working range 27. This factor and the large working range make it easy to position the scanner with respect to a bar code tag.

In fact, if the detector array 25 extends beyond the focal point of the lens 21, the projected image of the array 25a will extend to infinity, and the scanner will be capable of reading bar code tags at great distances so long as they are of sufficient size.

The angle 24 between the detector array plane B and the lens's principal plane A affects the length of the image 25a, and thus the working range. The inventors have found that an angle in the range of 45 to 60 degrees provides good operation, with an angle of 50 to 55 degrees preferred.

Because of the nature of the bar code pattern, it is not necessary to have the entire vertical image of the bar code in focus in order to read the bar code. Instead, it is only necessary to focus one horizontal segment across the bars and spaces to read the code. The optical system of the invention takes advantage of this, in combination with the optical properties of the Scheimpflug arrangement. In general, most of the image 23a of the bar code on the detector array 25 is out of focus. But over the working range 27 of the scanner, the image 23a will be in focus on at least one element of array 25, so that one slice across the bar code can be read.

The optical system of the invention produces several advantages which enable it to overcome many of the problems of conventional systems. The working range is determined mainly by the dimension of the detector array 25 and the magnification of the system, not by the f/# of the lens 21. The aperture of lens 21 can be large, reducing the illumination and resolution problems. By combining these two features, the optical system of the invention gives the bar code scanner a very large working range for bar codes, while operating at large enough apertures (small f/#) to image sufficient light on the detector array 25 to produce good resolution and good electrical signal to noise ratio. For example, with a detector array 10 mm long with elements 10 microns wide, lens focal length of 25 mm and magnification of 10, the working range is about 12.5 cm to infinity. For a high resolution bar code tag, the practical working range is about 12.5 cm to 50 cm. This is about twice as large as the working range of the best scanners with conventional optical systems.

Because of the reduced illumination requirements, in some operating environments using ambient illumination becomes an option. Where this is possible, eliminating the light source in the scanner lowers the power consumption of the scanner.

Finally, because the magnification changes over the working range of the system, with closer objects magnified more, very small high resolution tags can be read at short range, and large lower resolution tags can be read at long range. This greatly increases the versatility of the scanner. For example, one scanner can be used both for reading the small tags on printed circuit boards and for reading large tags on passing railroad cars or boxes on a conveyor belt.

In one embodiment, shown in FIG. 4, the detector array 45 is a linear array. A detector array with 128 elements, such as the Texas Instruments model TC102 CCD array, is suitable. To read the bar code tag, a scanning mechanism moves the image of the detector array across the bar code, effectively scanning the image of the bar code across the in-focus detector element.

In this arrangement, as in the arrangement shown in FIG. 2, array 45 is mounted at an angle to the optical axis of lens 41, in a first Scheimpflug plane. The optical axis is folded by the scanning mechanism, so the position of the Scheimpflug plane is shifted. In the embodiment of FIG. 4, the array is positioned along a line perpendicular to the intersection of the first Scheimpflug plane with the plane of the lens, i.e., so that the long axis of the detector array 45 is imaged perpendicular to the long axis of the image of the bar code tag 43. Thus, in this embodiment, the long axis of the detector array 45 is imaged onto the second Scheimpflug plane and defines the working range of the bar code reader.

Figure 4A:
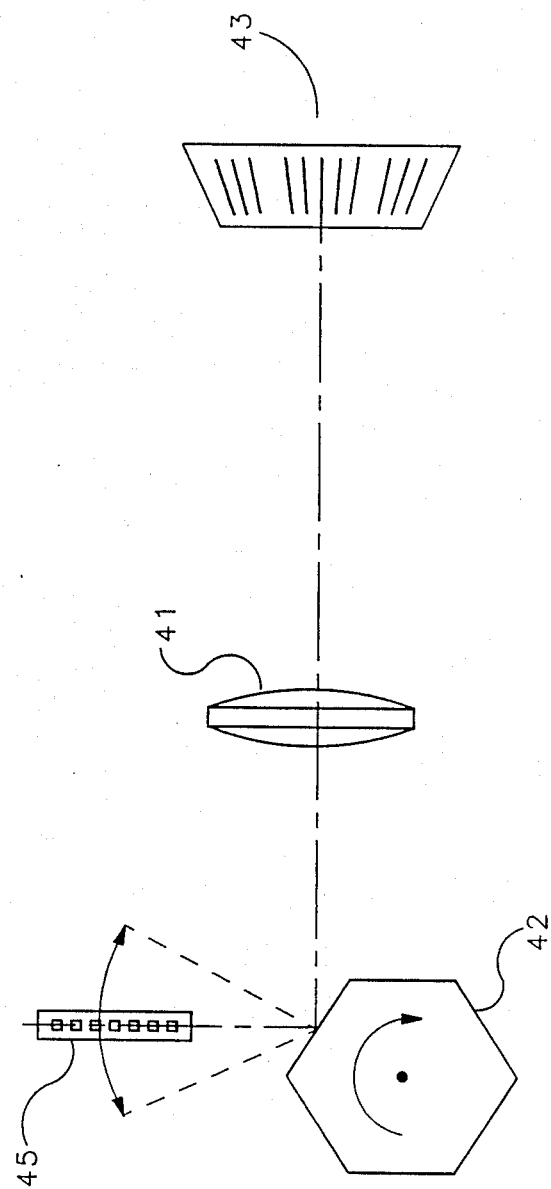
FIGS. 4A and 4B show a schematic diagram of a first embodiment of an optical system with a linear detector array and a scanning mechanism, constructed in accordance with the teachings of the invention.
Figure 4B:
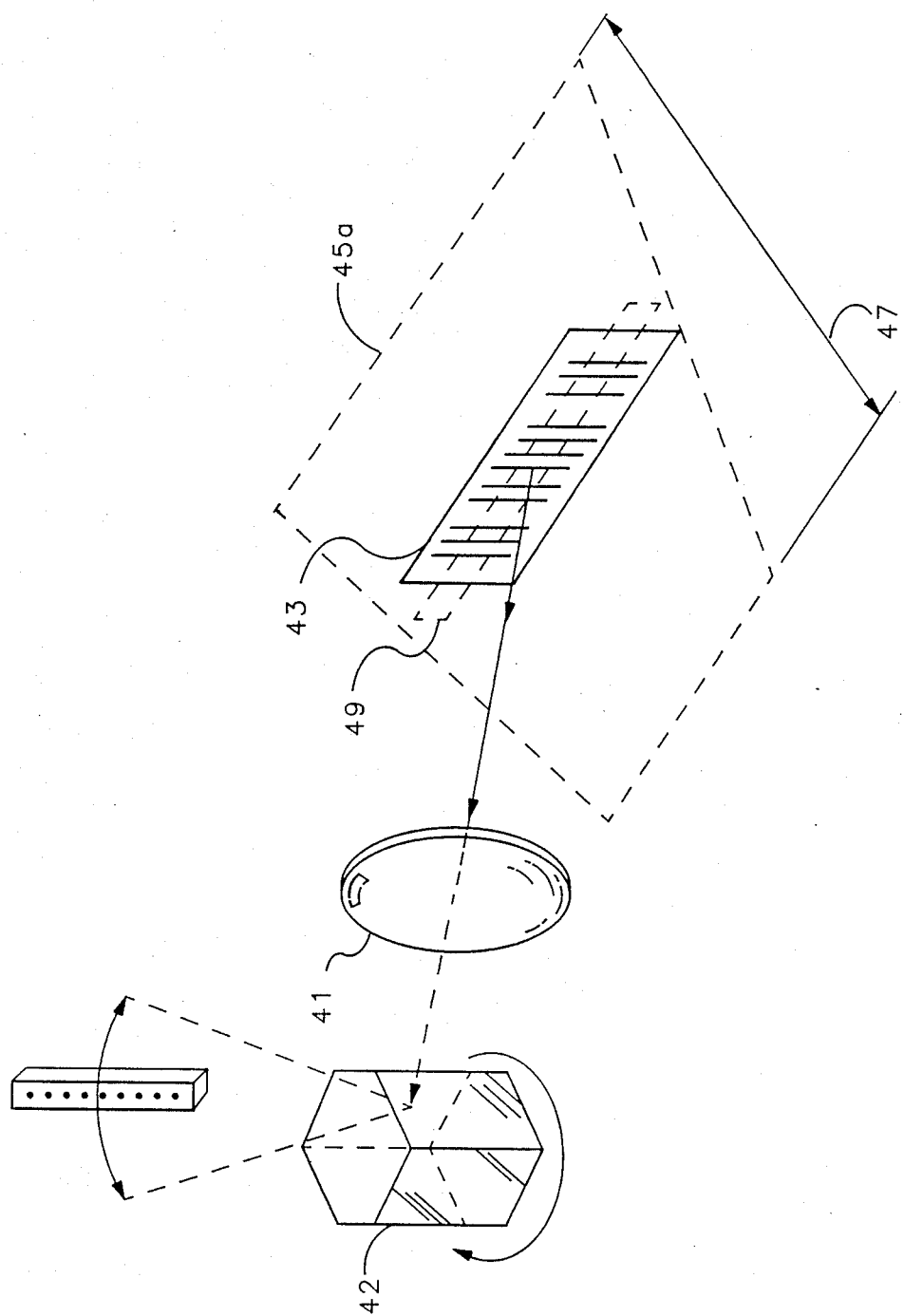

FIGS. 4A and 4B show a rotating mirror scanning mechanism, with a rotating multi-faceted mirror 42 placed in the optical path between the lens 41 and the detector array 45. As the mirror 42 rotates, it repeatedly sweeps the image of the bar code tag across detector array 45. The scanning function could be performed by a variety of other types of mechanisms, for example, a reciprocating mirror system such as a galvanometer scanner.

FIG. 5 shows a second embodiment using a linear detector. In this embodiment, the detector array 55 is again mounted in a first Scheimpflug plane of lens 51, but is positioned along a line parallel to the intersection of the first Scheimpflug plane with the plane of the lens, i.e., with its long axis parallel to the long axis of the image of the bar code tag 53. A scanning mechanism (not shown) moves the detector array 55 along the first Scheimpflug plane to provide an image of the detector array over the depth of field working range 57 in the second Scheimpflug plane. With a bar code tag located within the working range 57, this arrangement produces an image of the slice 59 where the bar code tag 53 intersects the second Scheimpflug plane, in focus on the elements of the detector array 55 as the detector is scanned past the location of image of the bar code tag during the depth of field scan. A linear detector array having on the order of 1728 elements, such as the Texas Instruments model TC101 CCD array will provide suitable resolution.

Figure 6:
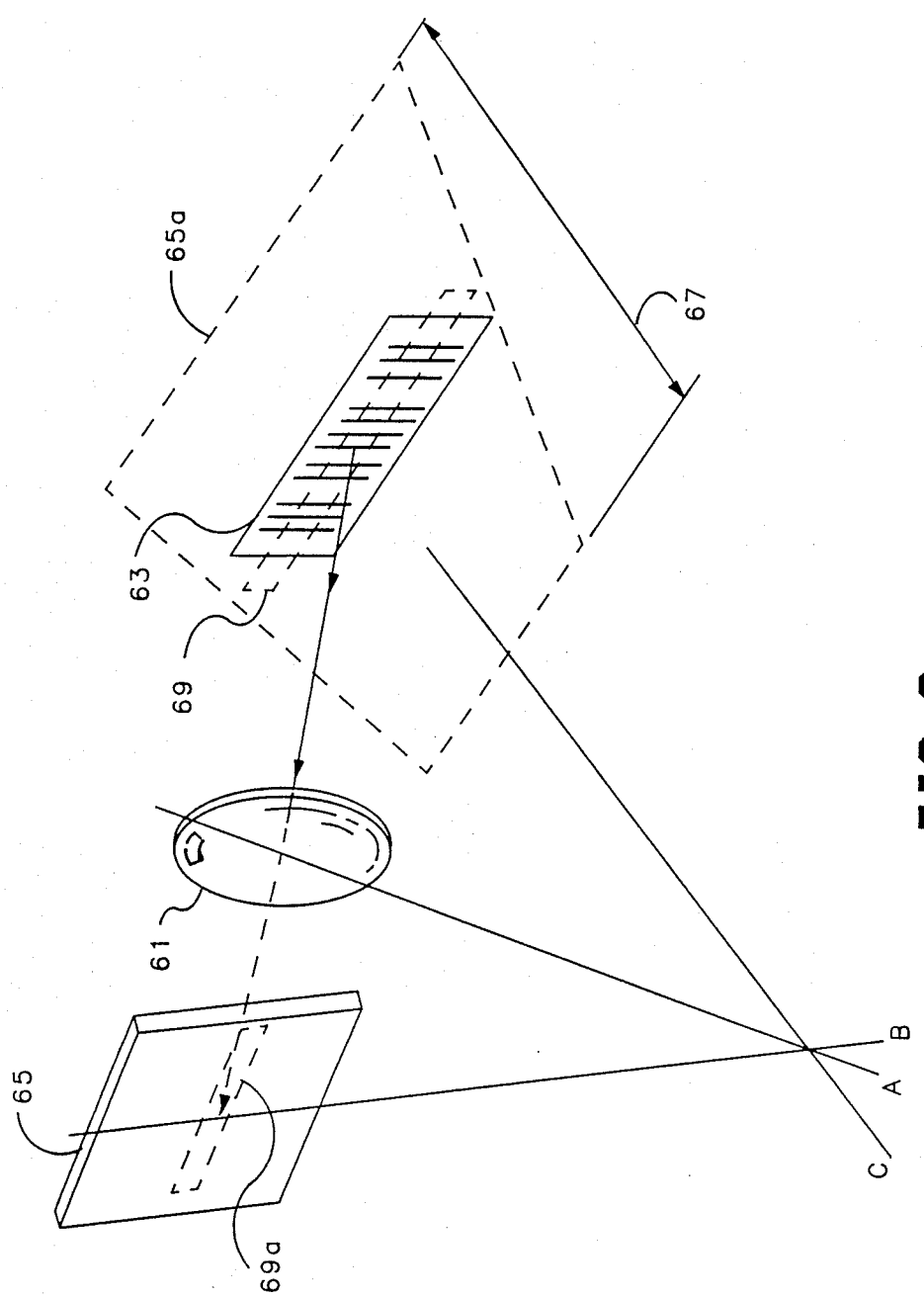
FIG. 6 shows a schematic diagram of a third embodiment of an optical system with a two dimensional detector array and no scanning mechanism, constructed in accordance with the teachings of the invention.

In another alternative embodiment, shown in FIG. 6, the use of a two dimensional detector array 65, which can be electronically scanned, eliminates the need for a scanning mechanism. The array 65 has columns of detector elements positioned along a line perpendicular to the intersection of the first Scheimpflug plane with the principal plane of the focussing means, and rows of detector elements positioned along a line parallel to the intersection of the first Scheimpflug plane with the principal plane of the focussing means. The optical arrangement is nearly identical to that of the system of FIG. 1, but the lens 61 images the two dimensional array 65 mounted in the first Scheimpflug plane onto a two dimensional space 65a in the second Scheimpflug plane. As FIG. 6 depicts, with a bar code tag intersecting the second Scheimpflug plane within the working range 67, this arrangement produces an image 69a of a slice 69 across the bar code tag 63 which is in focus on at least one line of elements of the detector array 65. A detector array with 768 by 244 elements, such as the Texas Instruments model TC240M CCD array provides suitable resolution.

An alternative to an array with elements of uniform size is an array with elements of varying size. Using smaller, more numerous elements in the area of the detector array imaged at the farther end of the working range 67 (the bottom of the array) increasing to larger elements in the area imaged at the nearer end of the working range 67 (the top of the array) will maintain constant resolution over the working range. The drawback to this arrangement is that resolution at the near end of the working range is lower than the best possible resolution.

Using the two dimensional array allows the construction of a bar code scanner with no moving parts, so it can be made very rugged.

In many instances, the optical system of the invention will image the bar code in acceptable focus on several elements of the detector array. When multiple scanning signals are available, electronic image processing can be used to further enhance the accuracy of the scanner. This results in an increased chance of accurately reading the bar code on the first try, even in marginal conditions. This feature also increases the ability of the system to read bar codes on curved surfaces or in a plane skewed to the centerline of the scanner.

It will be understood that a variety of light gathering optical elements could be used in place of the simple lens in the embodiments described. The light gathering function could be performed by, for example, lens arrays, gradient index lenses, mirrors, Fresnel zone plates, fiber optic bundles or holographic elements.

It is also within the scope of the invention to use a detector array comprised of discrete component detectors in place of an integrated component detector array. Although it is advantageous to locate the detectors in a plane for convenience of manufacture, i.e., as a single integrated circuit, the detectors can also be located on nonplanar surfaces so that individual detectors or lines of array elements can be located at different distances from the principal plane of the lens.

It will also be understood that the optical system of the invention is applicable to wand type bar code scanners, to improve the available depth of field or to reduce the tolerance requirements for the elements of the optical system.

What is claimed is:

1. An optical system for a bar code scanner for reading a bar code tag, comprising:
   a focusing means; and
   a two dimensional array of detectors positioned on a first surface tilted with respect to the principal plane of the focusing means, so that images of the detectors are formed on a second surface intersecting the bar code tag, and an image of the bar code tag is formed intersecting the first surface, with a portion of the image of the bar code tag substantially in focus on at least one of the detectors.

2. The optical system of claim 1, further comprising means for illuminating the bar code tag along the second surface.

3. The optical system of claim 1, wherein the detectors imaged closer to the optical system are wider than the detectors imaged farther away from the optical system.

4. An optical system for a bar code scanner for reading a bar code tag, comprising:
a focusing means;
a plurality of detectors positioned on a first surface tilted with respect to the principal plane of the focusing means, so that images of the detectors are formed on a second surface intersecting the bar code tag, and an image of the bar code tag is formed intersecting the first surface, with a portion of the image of the bar code tag substantially in focus on at least one of the detectors; and wherein the detectors imaged closer to the optical system are wider than the detectors imaged farther away from the optical system.

5. An optical system for a bar code scanner for reading a bar code tag, comprising:
a focusing means; and
a multi-element detector array positioned substantially in a first Scheimpflug plane with respect to the focusing means, so that an image of the detector array is formed substantially in a second Scheimpflug plane intersecting the bar code tag, and an image of the bar code tag is formed intersecting the first Scheimpflug plane, with a portion of the image of the bar code tag substantially in focus on at least one of the elements of the detector array; and
wherein the detector array extends beyond the focal point of the focusing means, so that the image of the detector array in the second Scheimpflug plane extends to infinity; and
means for illuminating the bar code tag along the second Scheimpflug plane.

6. The optical system of claim 5, wherein the detector array is a linear array positioned along a line perpendicular to the intersection of the first Scheimpflug plane with the principal plane of the focussing means, and the optical system further comprises means for scanning the image of the detector array across the bar code tag.

7. The optical system of claim 5, wherein the detector elements imaged closer to the optical system are wider than the detector elements imaged farther away from the optical system.

8. An optical system for a bar code scanner for reading a bar code tag, comprising:
a focusing means; and
a multi-element detector array positioned substantially in a first Scheimpflug plane with respect to the focusing means, so that an image of the detector array is formed substantially in a second Scheimpflug plane intersecting the bar code tag, and an image of the bar code tag is formed intersecting the first Scheimpflug plane, with a portion, of the image of the bar code tag substantially in focus on at least one of the elements of the detector array; and wherein
the detector array is a two dimensional array.

9. The optical system of claim 8, further comprising means for illuminating the bar code tag along the second Scheimpflug plane.

10. The optical system of claim 8, wherein the detector elements imaged closer to the optical system have larger areas than the detector elements imaged farther away from the optical system.

11. The optical system of claim 8, wherein the detector array extends beyond the focal point of the focussing means, so that the image of the detector array in the second Scheimpflug plane extends to infinity.

12. The optical system of claim 8 wherein the detector array comprises a plurality of columns of detector elements positioned along a line perpendicular to the intersection of the first Scheimpflug plane with the principal plane of the focusing means, and rows of detector elements positioned along a line parallel to the intersection of the first Scheimpflug plane with the principal plane of the focusing means.

13. An optical system for a bar code scanner for reading a bar code tag, comprising:
a focussing means; and
a detector; and
means for scanning the detector in at least one dimension on a first surface tilted with respect to principal plane of the focussing means, so that an image of the detector is formed on a second surface intersecting the bar code tag, and an image of the bar code tag is formed intersecting the first surface, with a portion of the image of the bar code tag substantially in focus on the detector at at least one point in the scan.

14. An optical system for a bar code scanner for reading a bar code tag, comprising:
a focussing means; and
a detector; and
means for scanning the detector in at least one dimension of a plane positioned in a first Scheimpflug plane with respect to the focussing means, so that an image of the detector is formed in a second Scheimpflug plane intersecting the bar code tag, and an image of the bar code tag is formed intersecting the first Scheimpflug plane, with a portion of the image of the bar code tag substantially in focus on the detector at at least one point in the scan.

15. The optical system of claim 14, further comprising means for illuminating the bar code tag along the second Scheimpflug plane.

16. The optical system of claim 14, wherein the detector is a linear array positioned along a line parallel to the intersection of the first Scheimpflug plane with the principal plane of the focussing means, and the optical system further comprises means for scanning the image of the detector array across a working range in the second Scheimpflug plane, intersecting the bar code tag.

17. The optical system of claim 16, wherein the scanning means scans the image of the detector array so that the working range extends to infinity.

18. The optical system of claim 16, wherein the scanning means physically moves the linear array across the image of the working range in the first Scheimpflug plane.

19. An optical system for a bar code scanner for reading a bar code tag, comprising:
a focussing means;
a two dimensional multi-element detector array, having rows and columns of elements, positioned substantially in a first Scheimpflug plane with respect to the focussing means, so that an image of the detector array is formed substantially in a second Scheimpflug plane intersecting the bar code tag, and an image of the bar code tag is formed intersecting the detector array in the first Scheimpflug plane, with a portion of the image of the bar code tag substantially in focus on at least one element in each column of elements in the detector array.

20. The optical system of claim 19, further comprising means for illuminating the bar code tag along the second Scheimpflug plane.

21. The optical system of claim 19, wherein the detector elements imaged closer to the optical system have larger areas than the detector elements imaged farther away from the optical system.

* * * * *